(No Model.)

W. E. SANBORN.
STEERING ATTACHMENT FOR BICYCLES.

No. 410,335. Patented Sept. 3, 1889.

WITNESSES:
Seth C. Baker
K. Durfer

INVENTOR:
William E. Sanborn
PER C. A. Shawtles
ATTYS.

UNITED STATES PATENT OFFICE.

WILLIAM E. SANBORN, OF BOSTON, MASSACHUSETTS.

STEERING ATTACHMENT FOR BICYCLES.

SPECIFICATION forming part of Letters Patent No. 410,335, dated September 3, 1889.

Application filed June 8, 1889. Serial No. 313,613. (No model.)

*To all whom it may concern:*

Be it known that I, WILLIAM E. SANBORN, of Boston, in the county of Suffolk, State of Massachusetts, have invented a certain new and useful Improvement in Steering Attachments for Bicycles, of which the following is a description sufficiently full, clear, and exact to enable any person skilled in the art or science to which said invention appertains to make and use the same, reference being had to the accompanying drawings, forming part of this specification, in which—

Figure 1:
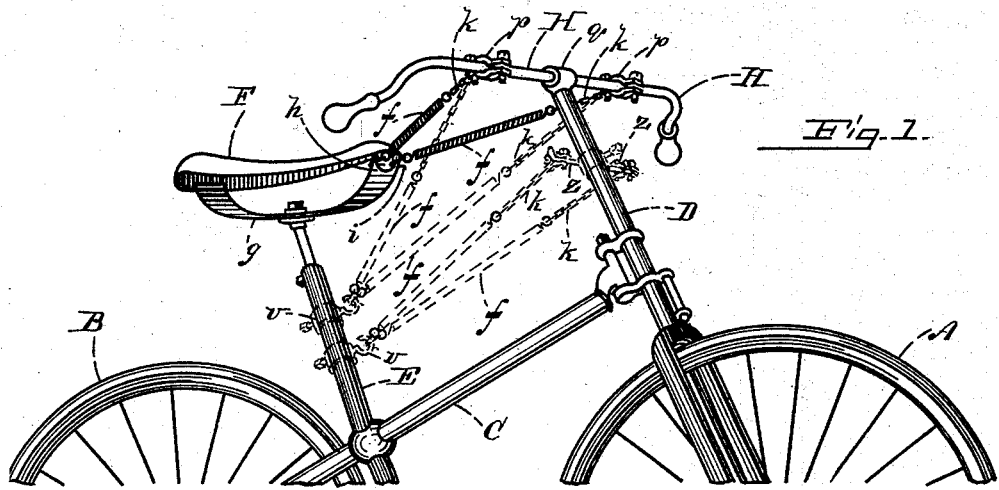
Figure 2:
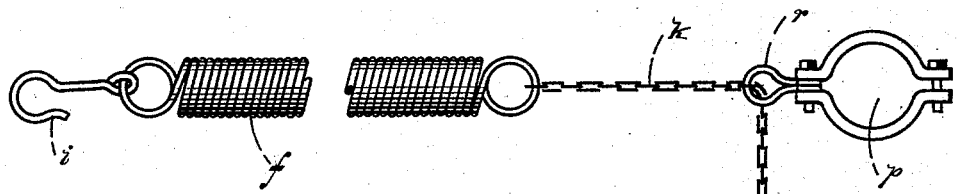
Figure 3:
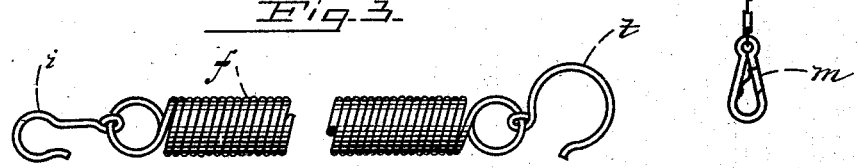

Figure 1 is a perspective view of a bicycle provided with my improvement, the wheels being represented as broken off; Fig. 2, an enlarged view of the attachment detached; and Fig. 3 a similar view showing a modification.

Like letters and figures of reference indicate corresponding parts in the different figures of the drawings.

It is well known that the class of bicycles known as "safety" machines, or those in which the driving mechanism is connected with the rear wheel, permitting the forward wheel to run free, are exceedingly difficult to steer without a firm grasp is at all times retained on the handles. There being no means for directing the course of the forward wheel other than by said handles, said wheel is very easily diverged from its course by slight obstructions in the road or the swaying of the body of the rider when his grasp is in a degree relaxed.

My invention is designed to overcome these and other objections; and to that end I make use of means which will be readily understood by all conversant with such matters from the following explanation:

As the bicycle is of the ordinary form of machines of this class, it is not deemed essential to specifically describe its construction.

In the drawings, A B represent the wheels; C, the backbone; D, the fork; E, the saddle-post; F, the saddle, and H the handle-bar. Two coiled springs $f$, of equal and known contractile power, are provided at corresponding ends with hooks $i$, which may readily be inserted in the ring $h$ of the saddle-spring $g$. To the opposite ends of said springs a chain $k$ is secured, said chains being provided with spring hooks or catches $m$. Two detachable ring-clamps $p$ are secured to the handle-bar H equidistant from the head $q$ of the fork D, said clamps being provided with an eye $r$. The chain $k$ of each spring is passed through an eye of said clamps and its catch $m$ engaged in a link of said chain. By means of said hooks and chains the tension of the springs on the handle-bar may readily be adjusted. As the fork D is pivoted to the backbone and the saddle and post fixed, it will be seen that by the use of the springs the forward wheel is centered and returned to its proper course after accidentally diverging therefrom, greatly lessening the exertions of the rider. The chain $k$ may be dispensed with and the other parts be constructed sufficiently long to enable a hook $t$, Fig. 3, thereon to be inserted in the clamp-eyes or directly around the handle-bar.

I do not confine myself to attaching the springs to the saddle, as a hook $v$ may be secured to the saddle-post E for this purpose; nor to connecting said springs directly to the handle-bar H, as laterally-projecting arms $z$ may be fastened to the fork D and the forward ends of the springs secured thereto, as illustrated by dotted lines in Fig. 1. The rear ends of the springs may, moreover, be attached directly to the backbone and rubber straps or cords substituted for the springs, if desired, without departing from the spirit of my invention, the intent of which is to supply an elastic or spring connection between a point on the backbone or a part rigidly connected therewith with a point at each side of the fork for restraining accidental lateral movements of the forward wheel A.

It will be understood that my invention is equally well adapted for use upon a tricycle, in which none of the driving mechanism is attached to the guide or forward wheel.

Having thus explained my invention, what I claim is—

1. In a bicycle of the character described, the springs $f$, having one end secured at a common point on the saddle F, their opposite ends being secured to the handle-bar H, respectively, at points equidistant from the fork D, substantially as described.

2. In a bicycle provided with the post E, fork D, and handle H, the clamps $p$ on said handle, and the springs $f$, having the chains $k$, connecting said post and clamps, substantially as described.

3. In a bicycle of the character described, two coiled springs of equal tension secured at one end to the saddle and provided with chains on their opposite ends for adjustably securing them, respectively, in two clamps on the handle-bar equidistant from the fork, substantially as described.

WILLIAM E. SANBORN.

Witnesses:
O. M. SHAW,
K. DURFEE.